United States Patent
Hale et al.

(10) Patent No.: US 8,756,568 B2
(45) Date of Patent: Jun. 17, 2014

(54) DOCUMENTATION GENERATION FOR WEB APIS BASED ON BYTE CODE ANALYSIS

(75) Inventors: Joseph Benjamin Hale, Southampton (GB); Andrew Wilkinson, Southampton (GB)

(73) Assignee: Pivotal Software, Inc., Palo Alto, CA (US)

( * ) Notice: Subject to any disclaimer, the term of this patent is extended or adjusted under 35 U.S.C. 154(b) by 33 days.

(21) Appl. No.: 13/563,674

(22) Filed: Jul. 31, 2012

(65) Prior Publication Data

US 2014/0040863 A1 Feb. 6, 2014

(51) Int. Cl.
*G06F 9/44* (2006.01)

(52) U.S. Cl.
USPC ........... 717/123; 717/100; 717/108; 717/118; 717/120

(58) Field of Classification Search
None
See application file for complete search history.

(56) References Cited

U.S. PATENT DOCUMENTS

| | | | |
|---|---|---|---|
| 7,260,775 B2 * | 8/2007 | Christensen et al. | 715/234 |
| 7,343,428 B2 * | 3/2008 | Fletcher et al. | 709/250 |
| 7,448,022 B1 * | 11/2008 | Ram et al. | 717/120 |
| 7,958,444 B2 * | 6/2011 | Jacquin et al. | 715/232 |
| 8,301,720 B1 * | 10/2012 | Thakker et al. | 709/217 |
| 8,347,265 B1 * | 1/2013 | Sirianni | 717/108 |
| 2003/0028528 A1 * | 2/2003 | Christensen et al. | 707/3 |
| 2003/0233631 A1 * | 12/2003 | Curry et al. | 717/100 |
| 2004/0243645 A1 * | 12/2004 | Broder et al. | 707/200 |
| 2006/0277456 A1 * | 12/2006 | Biberstein et al. | 715/512 |
| 2007/0233871 A1 * | 10/2007 | Fletcher et al. | 709/226 |
| 2007/0271554 A1 * | 11/2007 | Fletcher et al. | 717/147 |
| 2007/0294614 A1 * | 12/2007 | Jacquin et al. | 715/512 |
| 2008/0005064 A1 * | 1/2008 | Sarukkai | 707/3 |
| 2010/0228693 A1 * | 9/2010 | Dawson et al. | 706/12 |
| 2010/0241978 A1 * | 9/2010 | Genovese et al. | 715/765 |
| 2011/0067013 A1 * | 3/2011 | Frost et al. | 717/148 |
| 2011/0258526 A1 * | 10/2011 | Supakkul et al. | 715/230 |
| 2012/0303821 A1 * | 11/2012 | Fletcher et al. | 709/226 |
| 2013/0013725 A1 * | 1/2013 | Scheevel | 709/213 |
| 2013/0132815 A1 * | 5/2013 | Manber et al. | 715/230 |

* cited by examiner

*Primary Examiner* — Isaac Tecklu
(74) *Attorney, Agent, or Firm* — Fish & Richardson P.C.

(57) ABSTRACT

Documentation for an application or web service, such as a web application programming interface (API), is generated by analyzing bytecode for the application itself. Metadata contained within the bytecode and that specifies the functionality of the web service is extracted and used as a template and basis for documentation. A second source of documentation, which contains detailed documentation of the web service, is contributed by the web service developer and merged with the metadata extracted from the bytecode.

18 Claims, 3 Drawing Sheets

DOCUMENTATION GENERATION FOR WEB APIS BASED ON BYTE CODE ANALYSIS

BACKGROUND

Web services have become an increasingly popular method for providing users, developers, and system administrators with information technology services. In the context of web development, a web service typically uses a pre-defined set of Hypertext Transfer Protocol (HTTP) request messages and a pre-defined set of response messages having a pre-determined structure. A popular architecture known as Representational State Transfer (REST) constrains the pre-defined set of request messages to a set of well-known, standard operations (in the case of HTTP: "GET," "POST," "PUT," "DELETE").

Web developers that wish to use the web service must program their applications to send requests that exactly comply with the pre-defined messages and to process responses in the pre-determined structure, usually expressed in an Extensible Markup Language (XML) or JavaScript Object Notation (JSON) format. The provider of the web service typically creates API documentation that describes how request messages must be transmitted and what response messages can be expected. However, as web services and other APIs are developed, it may be difficult for the developer of the web service to create documentation that is accurate and up-to-date with the latest version of the web service. Conventional approaches have placed documentation of a web application within the source code as in-line programming comments. However, this approach becomes unwieldy as the amount of documentation begins to outgrow the amount of programming code in a particular file. Further, programming comments within source code are generally not available to the public or may be written in a form not suitable for public disclosure.

SUMMARY

One or more embodiments of the present invention provide techniques for generating documentation of a web service. In accordance with these techniques, bytecode for an application is submitted for analysis. Metadata contained within the bytecode and that specifies the functionality of the web service is extracted and used as a template and basis for documentation. Further, a second source of documentation is contributed by the web service developer and merged with the metadata extracted from the bytecode.

Embodiments of the present invention describe a method for generating documentation for an application configured to receive and process requests for a resource over a network. The method includes extracting annotations that are stored with machine-executable instructions of the application. The annotations may include syntactic metadata for a portion of the machine-executable instructions that is for processing the request. The method further includes generating documentation based on the extracted annotations, wherein the documentation includes information about the resource made available by the application.

Further embodiments of the present invention include a non-transitory computer-readable storage medium comprising instructions that, when executed in a computing device, perform an operation to generate documentation for an application configured to receive and process requests for a resource over a network. The operation may include extracting annotations that are stored with machine-executable instructions of the application, wherein the annotations include syntactic metadata for a portion of the machine-executable instructions that is for processing the request. The operation further includes generating documentation based on the extracted annotations, wherein the documentation includes information about the resource made available by the application.

Another embodiment of the present invention includes a computer system for generating documentation for an application configured to receive and process requests for a resource over a network. The computer system comprises a system memory and a processor. The processor is programmed to carry out the steps of extracting annotations that are stored with machine-executable instructions of the application, wherein the annotations include syntactic metadata for a portion of the machine-executable instructions that is for processing the request. The processor is further programmed to carry out the step of generating documentation based on the extracted annotations, wherein the documentation includes information about the resource made available by the application.

DETAILED DESCRIPTION

Figure 1A:
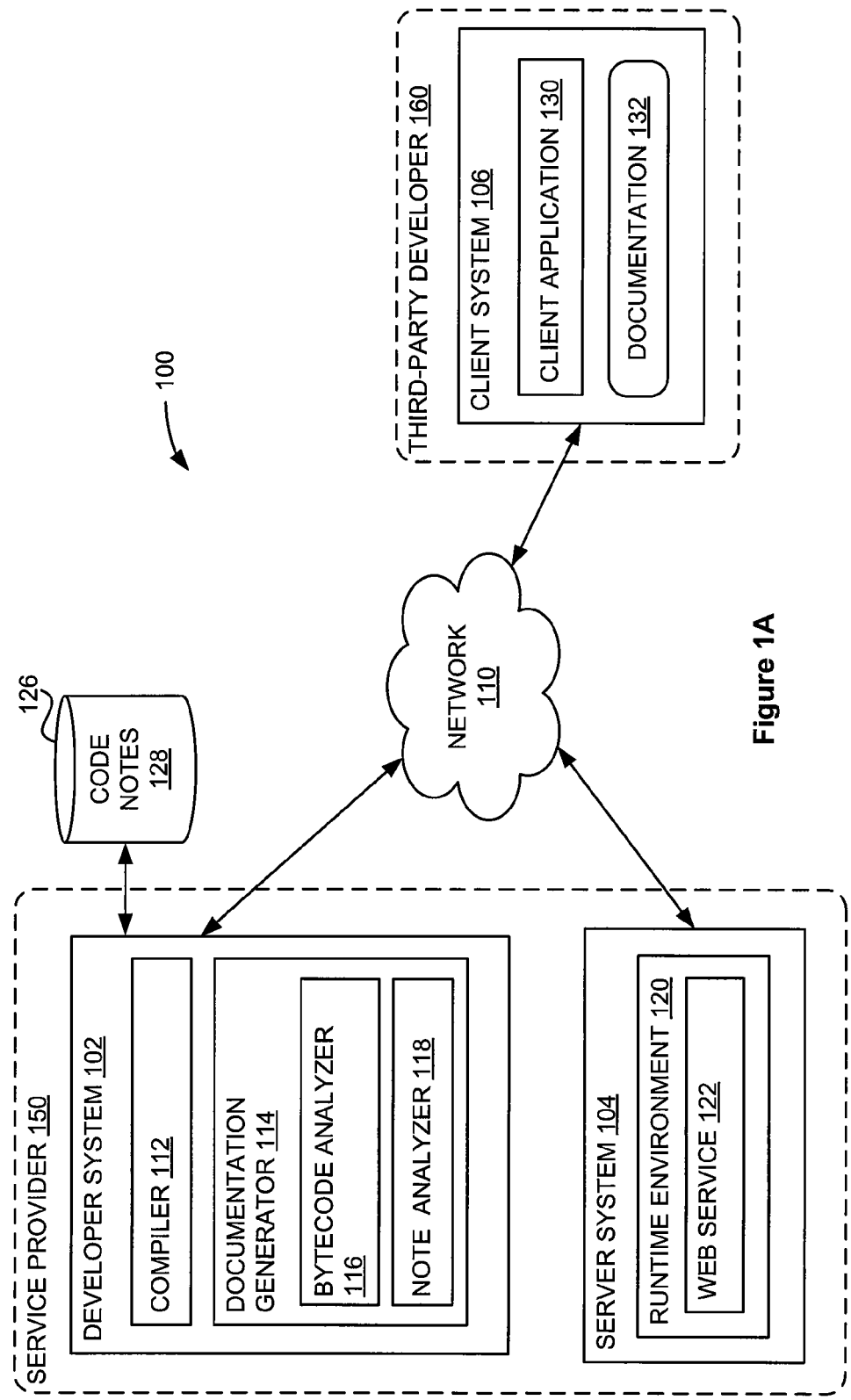
FIG. 1A is a block diagram that illustrates an exemplary computer system with which one or more embodiments of the present invention may be utilized.

FIG. 1A is a block diagram that illustrates an exemplary computer system 100 in which one or more embodiments of the present invention may be utilized. A service provider 150 seeks to develop an application, such as a web service 122, to be deployed on a server system 104. For example, service provider 150 may make certain services, such as database, file storage, virtual computing, and information services, accessible, for example, via REST (Representational State Transfer) APIs (Application Programming Interface) or any other client-server communication protocol over a network 110. In order to enable users, such as a third-party developer 160, to utilize web service 122, service provider 150 may generate and distribute documentation 132 that describes how third-party developer 160 may configure their own applications to access and utilize web service 122.

In one embodiment, computer system 100 includes a developer system 102, a server system 104, and a client system 106 communicatively connected via a network 110. Network 110 may be a local area network (LAN) connection, a wide area network (WAN), or other suitable communications network. In one embodiment, developer system 102 is configured to facilitate software development of a web service application 122 that provides a web services to client applications (e.g., client application 130) and generate documentation 132 for web service 122 based on bytecode for web service 122. Using information provided by documentation 132, a client application 130 executing on client system 106 may be configured to communicate with web service 122 executing on server system 104.

In one embodiment, developer system 102 includes a compiler 112 configured to generate "bytecode" based on source code 142 of an application (e.g., web service 122). By way of example, compiler 112 may compile source code 142 written in Java programming language into Java bytecode, and deploy the generated bytecode in a runtime environment 120 configured to parse and execute the bytecode, such as a Java Virtual Machine (JVM).

Developer system 102 is further configured to generating documentation 132 for web service 122 based on bytecode for web service 122. In one embodiment, the developer system 102 includes a documentation generator 114 having bytecode analyzer 116 and note analyzer 118 modules. Bytecode analyzer 116 is configured to parse bytecode for an application and retrieve metadata pertaining to web service 122. Bytecode analyzer 116 is further configured to generate an index for documentation describing web service 122 based on the metadata retrieved. Note analyzer 118 is configured to retrieve code notes 128 from a storage source (e.g., storage 126) and merge code notes 128 with the documentation index (e.g., generated by bytecode analyzer 116) to create documentation 132 describing web service 122.

In one embodiment, documentation generator 114 may be a plug-in component to a traditional IDE (i.e., integrated development environment) that assists a developer who creates web applications (e.g., web service 122) using the IDE to generate documentation for web service 122 according to techniques described herein. In some embodiments, once the developer has finished generating documentation for the web application (e.g., web service 122) using the IDE, the plug-in component may assist the developer in deploying web service (e.g., to server system 104.) The operations of developer system 102 are described further in conjunction with FIG. 2. Developer system 102 may be any computer system having conventional components, such as a processor, memory, storage, and network interface. Alternatively, developer system 102 may be a virtual machine (VM) sharing the hardware resources (e.g., processor, memory, storage, and/or networking resources) of a host computer (not shown). Developer system 102 includes storage system 126 configured to store code notes 128. Storage system 126 may be any conventional storage system accessible over network 110, such as shared storage, network shares, databases, or network-based file systems.

Server system 104 supports execution of bytecode for a web service application 122 and deployed from developer system 102. In one embodiment, server system 104 provides a runtime environment 120 configured to execute bytecode for one or more applications (e.g., web service 122) that provide, for example, web services, database services, and other information technology services that may involve retrieval, processing, and serving of data to one or more users. In the embodiments illustrated herein, runtime environment 120 is a Java Virtual Machine (JVM), although it should be recognized that other runtime environments and/or applications having a bytecode interpreter may be used without departing from the scope of the teachings herein. The embodiments presented should therefore not be interpreted to be exclusive or limiting, but rather exemplary or illustrative. Server system 104 may be any general purpose computer device that includes conventional components, such as a processor, memory, storage, and network interface. Alternatively, server system 104 may be a virtual machine (VM) sharing the hardware resources (e.g., processor, memory, storage, and/or networking resources) of a host computer (not shown).

In one embodiment, web service 122 includes a web service interface that supports machine-to-machine interactions over network 110. Web service 122 is configured to receive requests from client application (e.g., client application 130) at pre-determined "end points" and generate responses to return data and information to the requesting client application. In the embodiments illustrated herein, web service 122 includes a Representational State Transfer (REST) application programming interface (API) that receives and processes HTTP requests and returns a corresponding response. The received requests may identify a particular "resource" by a Uniform Resource Locator (URL) and at least one of a plurality of known operations (e.g., GET, POST, PUT, DELETE) to be performed on that resource. For example, web service 122 may process a REST API request specifying a HTTP GET operation at a URL containing "/book/124" and generate a response having information for a book corresponding to the identifier "124." It should be recognized that while embodiments describe web service 122 as having a REST API, other web services architectures, such as Simple Object Access Protocol (SOAP), may be used without departing from the scope of the teachings herein.

Client system 106 supports execution of one or more client applications 130 that are configured to communicate with web service 122 to retrieve information and/or modify a state of web service 122. To ensure proper interoperability between client application 130 and web service 122, a user, such as a third-party developer, has to carefully configure (e.g., at runtime, or during development) client application 130 to transmit requests to web service 122 having a pre-determined format and particular parameters expected by web service 122. Further, the user has to configure client application 130 to correctly process data returned in a response from web service 122 and arranged in pre-determined format. For example, the user may configure client application 130 to generate a HTTP request to the URL "http://www.example.com/get/books/all" with a request method of GET, and further configure client application 130 to expect a response formatted as an XML document. In one embodiment, the user configures client application 130 using information provided by documentation 132. Examples of information provided by documentation 132 include URLs (e.g., "http://www.example.com/get/books/all"), parameters (e.g., "bookid"), parameter types (e.g., integer, string, array), and other information suitable to instruct the user on how to properly configure client application 130 to utilize web service 122.

In one embodiment, client application 130 may be developed by third-party developer 160 using an integrated development environment (IDE) installed on the developer's laptop or terminal (e.g., client system 106). The developer's IDE may include an installed plug-in (e.g., provided by service provider 150) that displays documentation 132 during development to facilitate development of a client application 130 that uses web service 122. For example, while third-party developer 160 is writing programming code that transmits a request to web service 122, an installed plug-in may conveniently render documentation 132 alongside the programming code. Client system 106 may be any general purpose computer device that includes conventional components, such as a processor, memory, storage, and network interface. Alternatively, client system 106 may be a virtual machine (VM) sharing the hardware resources (e.g., processor, memory, storage, and/or networking resources) of a host computer (not shown).

Figure 1B:
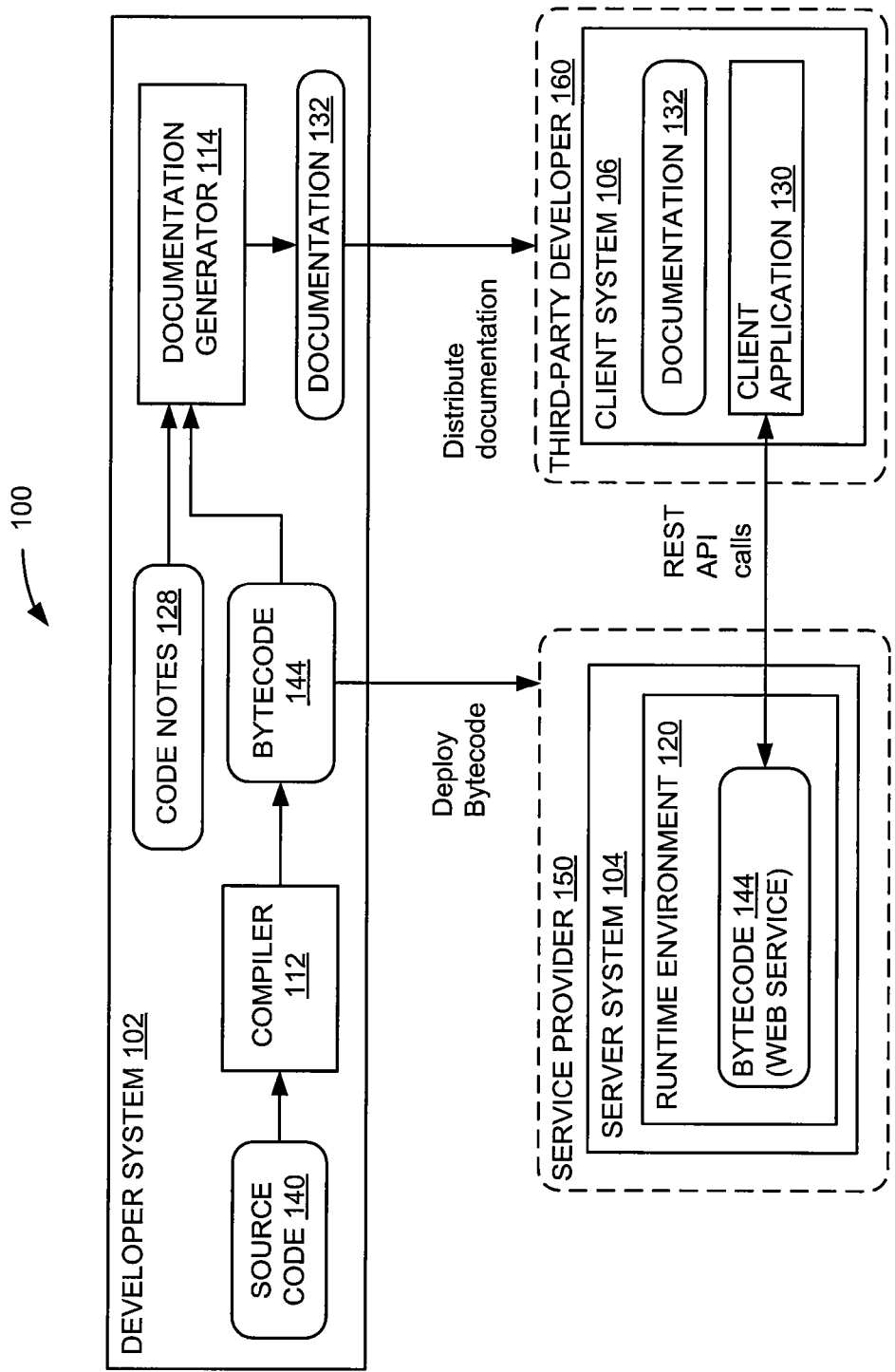
FIG. 1B is a block diagram that illustrates an exemplary computer system with which one or more embodiments of the present invention may be utilized.
Figure 2:
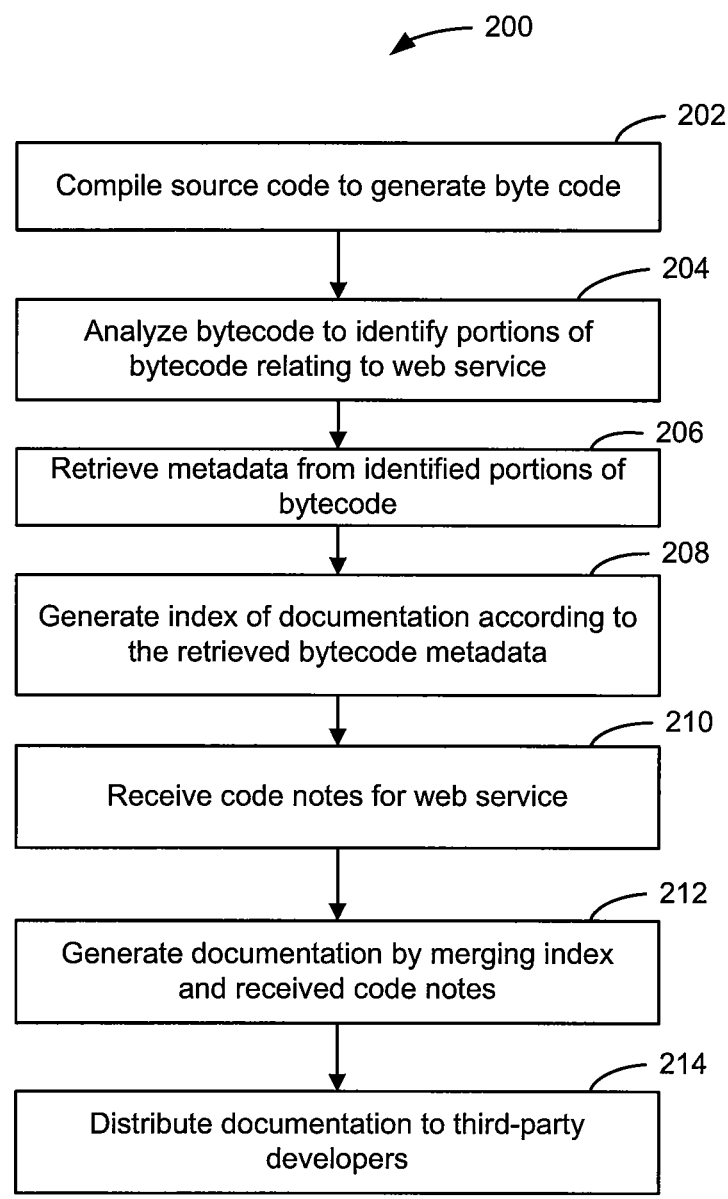
FIG. 2 is a flow diagram that illustrates steps for a method for generating documentation for an application configured to receive and process requests for a resource over a network, according to an embodiment of the present invention.

FIG. 2 is a flow diagram that illustrates steps for a method 200 for generating documentation 132 for a web service 122 configured to receive and process requests for a resource, according to an embodiment of the present disclosure. It should be recognized that, even though the method is described in conjunction with the systems of FIG. 1A and 1B, any system configured to perform the method steps is within the scope of embodiments of the invention.

At 202, compiler 112 processes source code 142 for a web service application 122 to generate one or more files of bytecode 144. In one embodiment, the service provider may develop web service application 122 using one or more application frameworks that support development of web-based applications, such as web services. The application frameworks provide libraries and tools that facilitate software development of common activities performed by web services, such as database access, templates, and session management. In some embodiments, the application frameworks may follow a request-based architectural pattern (sometimes referred to as "action-based" or "push-based" architecture) that processes requests to perform some action and returns any resultant data from the performed action. Examples of request-based application frameworks include Jakarta Struts, Django, Ruby on Rails, Symfony, Yii, and Spring MVC. To utilize such a request-based application framework, a software developer provides custom application code for handling requests and returning a response. The custom application code may be portions of source code 142 that include classes and/or methods that access, modify, and retrieve application data, generate text, graphic, and audio output, and/or perform other programming tasks.

In one embodiment, source code 142 of web service 122 specifies a mapping between requests and portions of source code 142 (referred to as a "request mapping") that indicates which application code is to be executed to process a particular request. As such, in operation, when web service 122 receives a particular request, the application framework is able to determine which application code to execute to process the received request. Source code 142 specifies one or more resources, identified by a particular location (e.g., URL), that map to a portion of application code configured to process a request received at the particular location. In some embodiments, source code 142 specifies a string pattern (e.g., URL pattern) that may be used to match one or more locations of resources. In some embodiments, source code 142 of web service specifies request parameters for web service 122, such as a particular HTTP method (e.g., GET, POST, and PUT), types of input accepted in a request, and types of output to be expected in a response.

In one embodiment, source code 142 includes one or more "annotations" to apply behavior of a request-based application framework to portions of source code 142. Annotations generally refer to a form of syntactic metadata that may be added to source code to modify behavior of compiler 112 during compilation of source code 142. By way of example, a software developer may add a "@Deprecated" annotation to a method to cause compiler 112 to issue an error or warning if that annotated method is ever used. While programming comments (e.g., "/*comment*/") within source code 142 are ignored and discarded by compilers and interpreters, the annotations described herein mark portions of source code 142 and are retained after compilation within bytecode 144. The use of annotations to apply an application framework and specify a request mapping can be illustrated with reference to Table 1 below.

TABLE 1

Example of Annotations in Application Code 01  import org.springframework.*;
02
03  @Controller
04  @RequestMapping("/userRegistration.htm")
05  @SessionAttributes("user")

TABLE 1-continued

Example of Annotations in Application Code 06  public class UserController {
07
08      private UserService userService;
09
10      @Autowired
11      public void setUserService(UserService userService) {
12          this.userService = userService;
13      }
14
15      @RequestMapping(method = RequestMethod.GET)
16      public String showUserForm(ModelMap model) {
17          User user = new User( );
18          model.addAttribute(user);
19          return "userForm";
20      }
21
22      @RequestMapping(method = RequestMethod.POST)
23      public String onSubmit(@ModelAttribute("user") User user) {
24          serService.add(user);
25          return "redirect:userSuccess.htm";
26      }
27
28  }

The Java programming code listing in Table 1 illustrates an annotation "@Controller," at line 03, which specifies the class UserController to be used as a "controller" by the application framework. The annotation "@RequestMapping," at line 04, specifies that the UserController class is mapped to any request for the resource "/userRegistration.htm," such as, for example, if a user operates a web browser to navigate to the URL "www.example.com/userRegistration.htm," the application framework proceeds to execute application code for UserController. As shown in Table 1, annotations may specify request mapping for individual methods in the UserController class of the application code. For example, the annotation "@RequestMapping(method=RequestMethod.GET)," at line 15, further specifies that any requests handled by UserController and having an HTTP operation of "GET" should be handled by the method showUserForm( ). Similarly, the annotation "@RequestMapping(method=RequestMethod.POST)," at line 22, specifies that any requests handled by UserController and having an HTTP operation of "POST" should be handled by the method onSubmit( ) While embodiments illustrated herein discuss Java annotations used for a Spring application framework, it should be recognized that other programming languages and other application frameworks may be utilized in accordance with techniques described herein.

Referring back to FIG. 2, when compiler 112 processes source code 142 to generate bytecode 144, compiler 112 translates source code 142, which is generally human-readable, into a plurality of compact numeric codes, constants, and references that may be directly interpreted by runtime environment 120. In one embodiment, the annotations included in source code 142, which specify the request mapping of web service 122, are preserved in bytecode 144.

At 204, bytecode analyzer 116 analyzes bytecode 144 to identify portions of bytecode 144 related to web service 122. In one embodiment, bytecode analyzer 116 processes bytecode 144 to generate a searchable data structure having all executable instructions, information, and metadata contained in bytecode 144. Bytecode analyzer 116 may traverse bytecode 144 and search for annotations specifying details of the web service.

Bytecode analyzer 116 searches bytecode 144 for annotations recognized by a request-based application framework for specifying a request mapping between resource locations and one or more portions of bytecode 144. In one embodiment, bytecode analyzer 116 searches bytecode 144 for user-defined classes that have annotated that indicate the user-defined class is configured to handle requests. In the example of the code listing provided above, bytecode analyzer 116 searches for an annotation labeled "@Controller" that makes an application class (e.g., UserController) configured to handle requests for web service 122. In some embodiments, once bytecode analyzer 116 identifies a controller class, bytecode analyzer 116 may further search within the controller class (e.g., UserController) to identify one or more methods of that class that are configured to handle requests for web service 122. For example, bytecode analyzer 116 identifies methods showUserForm( ) and onSubmit( ) has having annotations "@RequestMapping" that define a request mapping.

In one embodiment, bytecode analyzer 116 is configured to properly navigate class inheritance and other similar object-oriented hierarchies defined by bytecode 144 while searching for annotations that specify a request mapping. Bytecode analyzer 116 may search child classes and parent classes that may inherit annotations defined for a particular class. For example, if a particular class (e.g., UserController) has been annotated as a controller class, bytecode analyzer 116 may further search for any child class that inherits from UserController and that may override a method already having a request mapping. Further, although bytecode analyzer 116 may not find an annotation for a particular class, bytecode analyzer is configured to navigate up the hierarchy to examine all of its parent classes. Similarly, bytecode analyzer 116 may identify a request mapping for a particular method, and then proceed to check the method's enclosing class for a request mapping, as shown in the example of Table 1 (e.g., the "RequestMapping" annotation found for both the UserController class and its individual methods showUserForm( ) and onSubmit( ).

At 206, bytecode analyzer 116 retrieves metadata from the identified portions of bytecode 144. In one embodiment, bytecode analyzer 116 retrieves metadata, information, and attributes contained in the annotations that are related to web service 122. For example, when retrieving metadata for the identified method showUserForm( ) bytecode analyzer 116 retrieves not only the "@RequestMapping" annotation, but also the attribute "method" and corresponding value "RequestMethod.GET" contained therein. It should be recognized that annotations may specify a variety of attributes, such as a method or HTTP operation, a path that may be used to match URL for a request, and data types of input and output handled by web service 122. In one embodiment, bytecode analyzer 116 determines a URL specified by a request mapping and based on an object-oriented navigation of bytecode 144. For example, bytecode analyzer 116 may construct a URL path by appending parts of paths specified by each level of classes and methods.

In one embodiment, bytecode analyzer 116 may determine input parameters specified by a request mapping. For example, the request mapping information retrieved for the onSubmit( ) method may include information indicating a parameter "user" is specified by an annotation "@ModelAttribute". In one embodiment, bytecode analyzer 116 may determine a data type of input and/or output handled by a particular resource of web service 122 based on a HTTP header field (e.g., "Accept:", "Content-Type:") that specifies certain media types which are acceptable for a request.

At 208, documentation generator 114 generates an index of documentation according to the retrieved metadata. Because documentation generator 114 is deriving documentation based on certain immutable information (e.g., HTTP method, URL) as specified by source code 142 itself), documentation generator 114 is able to generate a canonical listing of resources made available by web service 122 using a process that is less prone to human input errors and less susceptible to synchronization issues. The index of documentation comprises a data structure that provides a skeleton document that outlines information retrieved about web service 122. Documentation generator 114 may create a unique key for each resource (e.g., REST endpoint) identified in bytecode 144. In one embodiment, the unique for each entry in the index that describes a REST endpoint may comprise an HTTP method and a URL for that REST end point (e.g., "GET/userRegistration.htm"). By way of example, an index of documentation resulting from the example code listing may appear in Table 2 below:

TABLE 2

Example of Index of Documentation

[{
    "method" : "GET",
    "path" : "/userRegistration.htm"
},{
    "method" : "POST",
    "path" : "/userRegistration.htm",
    "attribute" : "user"
}]

In some embodiments, the index of documentation is stored as an Extensible Markup Language (XML), JavaScript Object Notation (JSON), or other suitable structured or semi-structured document format.

At 210, note analyzer 118 receives code notes 128. Code notes 128 provide application documentation having comprehensive details for web service 122. In one embodiment, each entry in code notes 128 includes a key that may be used to uniquely match with a corresponding entry in the index of documentation (e.g., generated in 208). For example, a key for an entry in code notes 128 may comprise an HTTP method and URL path for the API endpoint. The developer of web service 122 may provide a plurality of code notes 128 that describe in detail each resource made available by web service 122. Code notes 128 may be any text, graphics, and/or audio content that may include brief technical summaries, technical details, long form explanations of web service 122, examples of code, tables, charts, etc. Specific examples of information that be provided by code notes 128 include a status flag indicating whether an API endpoint is active, in-development, or deprecated; a short description, or "slug"; a long text description; a list of return codes that may be provided in a response, with corresponding textual reasons; and an example request for the web service endpoint. In some embodiments, code notes 128 may be stored as one or more files formatted as Extensible Markup Language (XML), JavaScript Object Notation (JSON), or other suitable structured or semi-structured document format. In one embodiment, code notes 128 may generated by a content management system, text editor, or IDE executing on developer system 102. By providing code notes 128 as separate from source code 142, embodiments of the present disclosure advantageously eliminate the need to place large amounts of long-form text within source code 142, which may be unwieldy during development, and may introduce inadvertent bugs.

At 212, note analyzer 118 generates a documentation file 132 by merging the index of documentation and the received code notes 128. In one embodiment, note analyzer 118 traverses the documentation index, retrieves a code note 128 for each entry in the index based on the key of the index (e.g., HTTP method and URL path), and merges the canonical information in the documentation index (derived from bytecode 144) with the detailed information in code notes 128. In some embodiments, note analyzer 118 may notify a user (e.g., by raising an alert) that a corresponding code note 128 cannot be found for a particular entry in the index of documentation. Further, note analyzer 118 may raise an alert when a code note 128 is found that has no corresponding entry in the index of documentation. Accordingly, note analyzer 118 assists service provider 150 in identifying portions of documentation 132 that lack detailed documentation (in the case of a missing code note) or where functionality of web service 122 has been eliminated (in the case of an orphaned code note). In some implementations, documentation 132 may be stored as one or more files formatted as Extensible Markup Language (XML), JavaScript Object Notation (JSON), or other suitable structured or semi-structured document format. An example of documentation 132 is shown below in Table 3.

TABLE 3

Example of Generated Documentation

```
{
    "method" : "GET",
    "path" : "/tc-server/v1",
    "complete" : true,
    "slug" : "The main entry point the API",
        "description" : "This is the main entry point to the API. **This
    is the only URI required to be known** and all other APIs can be
    accessed via links from this and other payloads.",
        "return-codes" : [ {
            "code" : 200,
            "reason" : "Success"
        }, {
            "code" : 500,
            "reason" : "There was a server-side I0 problem such as a disk
    being full, etc."
        } ],
        "links" : [ {
            "name" : "groups",
            "description" : "The collection of group resources registered
    with the service",
            "always" : true
        }, {
            "name" : "nodes",
            "description" : "The collection of node resources registered
    with the service",
            "always" : true
        }, {
            "name" : "template images",
            "description" : "The collection of template image resources
    registered with the service",
            "always" : true
        } ],
        "examples" : [ {
            "title" : "Typical",
            "request" : "\tGET /tc-server/v1/\n\tAccept:
    application/json;charset=UTF-8",
            "response" : "\t200 OK\n\tContent-Type:
    application/json;charset=UTF-8\n\t \n\t{\n\t 'links': [\n\t {\n\t
    'rel': 'groups',\n\t 'type': 'application/json;charset=UTF-8',\n\t
    'href': 'http://localhost/tcserver/v1/groups'\n\t }, {\n\t 'rel':
    'installation-images',\n\t 'type':
    'application/json;charset=UTF-8',\n\t 'href':
    'http://localhost/tc-server/v1/installation-images'\n\t },
    {\n\t 'rel': 'nodes',\n\t 'type':
    'application/json;charset=UTF-8',\n\t 'href':
    'http://localhost/tc-server/v1/nodes'\n\t }, {\n\t 'rel':
    'revision-images',\n\t 'type':
    'application/json;charset=UTF-8',\n\t 'href':
    'http://localhost/tc-server/v1/revision-images'\n\t },
    {\n\t 'rel': 'template-images', \n\t 'type':
    'application/json;charset=UTF-8',\n\t 'href':
    'http://localhost/tc-server/v1/template-images'\n\t }\n\t ]\n\t}"
        } ]
}
```

At 214, service provider 150 distributes the generated documentation 132 to third-party developers 160 that may wish to use web service 122. In one particular implementation, documentation 132 may be a JSON file that encompasses all information from the index of documentation and code notes 128. A documentation viewer may be configured to load the JSON file (e.g., via JavaScript) and dynamically render the contents of documentation 132 as a web page viewable in a conventional web browser. In another implementation, documentation 132 may be dynamically loaded into an IDE of third-party developer 160 and be rendered inline or alongside programming code of a client application configured to contact web service 122.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. For example, compiler 112 may be separate from a developer system 102 having documentation generator 114, and bytecode 144 (and no source code) may be provided to the documentation generator 114. Further, while embodiments are described with application frameworks that follow a model-view-controller (MVC) architecture, it should be recognized that other forms of application frameworks (such as a component-based framework) and other mechanisms for specifying request mappings may be utilized in accordance with techniques described herein. In the claims, elements and/or steps do not imply any particular order of operation, unless explicitly stated in the claims.

The various embodiments described herein may employ various computer-implemented operations involving data stored in computer systems. For example, these operations may require physical manipulation of physical quantities which usually, though not necessarily, take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the description provided herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system; computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD-ROM (Compact Disc-ROM), a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method comprising:
    obtaining bytecode corresponding to a web service that includes an application programming interface (API);
    identifying a particular annotation included in the bytecode, wherein an annotation comprises text that is included in source code, and that a compiler preserves in bytecode that is generated from the source code;
    identifying one or more parameters associated with the web service from the particular annotation included in the bytecode;
    generating a template for documentation for the API of the web service, wherein the template specifies the one or more parameters that are identified from the particular annotation included in the bytecode;
    obtaining a plurality of code notes, wherein each of the plurality of code notes comprises a description of the web service; and
    merging the template and at least a portion of the plurality of code notes to generate the documentation for the API of the web service; and
    wherein generating the template for documentation for the API of the web service comprises generating one or more documentation indices, wherein each index maps one or more parameters from an annotation to a code note.

2. The method of claim 1, wherein merging the template and at least a portion of the plurality of code notes to generate the documentation for the API of the web service comprises:
    identifying one or more code notes of the plurality of code notes corresponding to the identified one or more parameters;
    mapping each identified code note to one or more parameters of the identified one or more parameters;
    storing each mapping in an index of the one or more documentation indices.

3. The method of claim 1, wherein identifying a particular annotation comprises:
    identifying a request mapping that maps a portion of the bytecode to a request for a resource; and
    identifying the particular annotation from the request mapping.

4. The method of claim 1 further comprising:
    searching bytecode for a function configured to process a request for a resource made available by the application; and
    including one or more parameters from the function in the identified one or more parameters.

5. The method of claim 1, wherein identifying one or more parameters comprises:
    identifying an annotation of a parent class, wherein a child class inherits from the parent class;
    associating the annotation with the child class; and
    identifying the one or more parameters from the annotation of the child class.

6. The method of claim 5 further comprising:
    identifying one or more parameters from the annotation of the parent class, wherein a parameter of the one or more parameters is a name of a first function included in the parent class:
    determining that a name of a second function included in the child class is a same name as the name of the first function; and
    including one or more parameters from the second function in the identified one or more parameters from the annotation of the child class.

7. The method of claim 1, wherein the identified one or more parameters include a name of a Hypertext Transfer Protocol (HTTP) request and a universal resource locator (URL) pattern.

8. A system comprising:
    one or more computers and one or more storage devices storing instructions that are operable, when executed by the one or more computers, to cause the one or more computers to perform operations comprising:
    obtaining bytecode corresponding to a web service that includes an application programming interface (API);
    identifying a particular annotation included in the bytecode, wherein an annotation comprises text that is included in source code, and that a compiler preserves in bytecode that is generated from the source code;
    identifying one or more parameters associated with the web service from the particular annotation included in the bytecode;
    generating a template for documentation for the API of the web service, wherein the template specifies the one or more parameters that are identified from the particular annotation included in the bytecode;
    obtaining a plurality of code notes, wherein each of the plurality of code notes comprises a description of the web service; and
    merging the template and at least a portion of the plurality of code notes to generate the documentation for the API of the web service, and
    wherein generating the template for documentation for the API of the web service comprises generating one or more documentation indices, wherein each index maps one or more parameters from an annotation to a code note.

9. The system of claim 8, wherein merging the template and at least a portion of the plurality of code notes to generate the documentation for the API of the web service comprises:
    identifying one or more code notes of the plurality of code notes corresponding to the identified one or more parameters;
    mapping each identified code note to one or more parameters of the identified one or more parameters;
    storing each mapping in an index of the one or more documentation indices.

10. The system of claim 8, wherein identifying a particular annotation comprises:
   identifying a request mapping that maps a portion of the bytecode to a request for a resource; and
   identifying the particular annotation from the request mapping.

11. The system of claim 8, wherein the operations further comprise:
   searching bytecode for a function configured to process a request for a resource made available by the application; and
   including one or more parameters from the function in the identified one or more parameters.

12. The system of claim 8, wherein identifying a particular annotation comprises:
   identifying an annotation of a parent class, wherein a child class inherits from the parent class;
   associating the annotation with the child class; and
   identifying the one or more parameters from the annotation of the child class.

13. The system of claim 12, wherein the operations further comprise:
   identifying one or more parameters from the annotation of the parent class, wherein a parameter of the one or more parameters is a name of a first function included in the parent class;
   determining that a name of a second function included in the child class is a same name as the name of the first function; and
   including one or more parameters from the second function in the identified one or more parameters from the annotation of the child class.

14. The system of claim 8, wherein the identified one or more parameters include a name of a Hypertext Transfer Protocol (HTTP) request and a universal resource locator (URL) pattern.

15. A computer program product, encoded on one or more non-transitory computer storage media, comprising instructions that when executed by one or more computers cause the one or more computers to perform operations comprising:
   obtaining bytecode corresponding to a web service that includes an application programming interface (API);
   identifying a particular annotation included in the bytecode, wherein an annotation comprises text that is included in source code, and that a compiler preserves in bytecode that is generated from the source code;
   identifying one or more parameters associated with the web service from the particular annotation included in the bytecode;
   generating a template for documentation for the API of the web service, wherein the template specifies the one or more parameters that are identified from the particular annotation included in the bytecode;
   obtaining a plurality of code notes, wherein each of the plurality of code notes comprises a description of the web service; and
   merging the template and at least a portion of the plurality of code notes to generate the documentation for the API of the web service, and
   wherein generating the template for documentation for the API of the web service comprises generating one or more documentation indices, wherein each index maps one or more parameters from an annotation to a code note.

16. The computer program product of claim 15, wherein merging the template and at least a portion of the plurality of code notes to generate the documentation for the API of the web service comprises:
   identifying one or more code notes of the plurality of code notes corresponding to the identified one or more parameters;
   mapping each identified code note to one or more parameters of the identified one or more parameters;
   storing each mapping in an index of the one or more documentation indices.

17. The computer program product of claim 15, wherein the operations further comprise:
   searching bytecode for a function configured to process a request for a resource made available by the application; and
   including one or more parameters from the function in the identified one or more parameters.

18. The computer program product of claim 15, wherein identifying a particular annotation comprises:
   identifying an annotation of a parent class, wherein a child class inherits from the parent class;
   associating the annotation with the child class; and
   identifying the one or more parameters from the annotation of the child class.

* * * * *